Nov. 14, 1967     D. W. LONGSHORE     3,352,394

CLUTCHES WITH CONTROL VALVE

Filed Aug. 2, 1965

Inventor:
Donald W. Longshore
By Kenneth T. McKim
Attorney

United States Patent Office 3,352,394
Patented Nov. 14, 1967

3,352,394
CLUTCHES WITH CONTROL VALVE
Donald W. Longshore, Milwaukee, Wis., assignor to Allis-Chalmers Manufacturing Company, Milwaukee, Wis.
Filed Aug. 2, 1965, Ser. No. 476,597
5 Claims. (Cl. 192—87.19)

ABSTRACT OF THE DISCLOSURE

A hydraulic valve having a resiliently controlled spool for gradually increasing the pressure of the fluid transmitted to a fluid actuator.

This invention relates generally to hydraulic valves and is more particularly concerned with a central spool type valve to control a pair of hydraulically actuated transmission clutches.

In the operation of friction clutches of the fluid actuated type, control valves are used for selectively directing fluid to the clutches to effect engagement or disengagement of the clutch plates. In the present instance, a hydraulic valve controls the clutches for either a high or low range of tractor operation. Normally when a conventional control valve is actuated to engage the plates of a friction clutch, the fluid pressure rise is very rapid resulting in shock engagement of the clutch plates. This rapid engagement of the clutch is objectionable as it results in a substantial jerk which may have a deleterious effect either upon the operator or the mechanism.

An object of this invention is to provide a control valve for a clutch which eliminates shock engagement of the clutch plates.

A further object of this invention is to provide a control valve for a clutch wherein the pressure rise in the clutch cylinder is elevated at a uniform rate.

A further object of this invention is to provide a simple, compact structure for reducing or eliminating shock to a hydraulic system caused by sudden stoppage of fluid flow by the control valve.

A further object of this invention is to provide a hydraulic control valve which can be manufactured readily at a modest cost.

Figure 1:
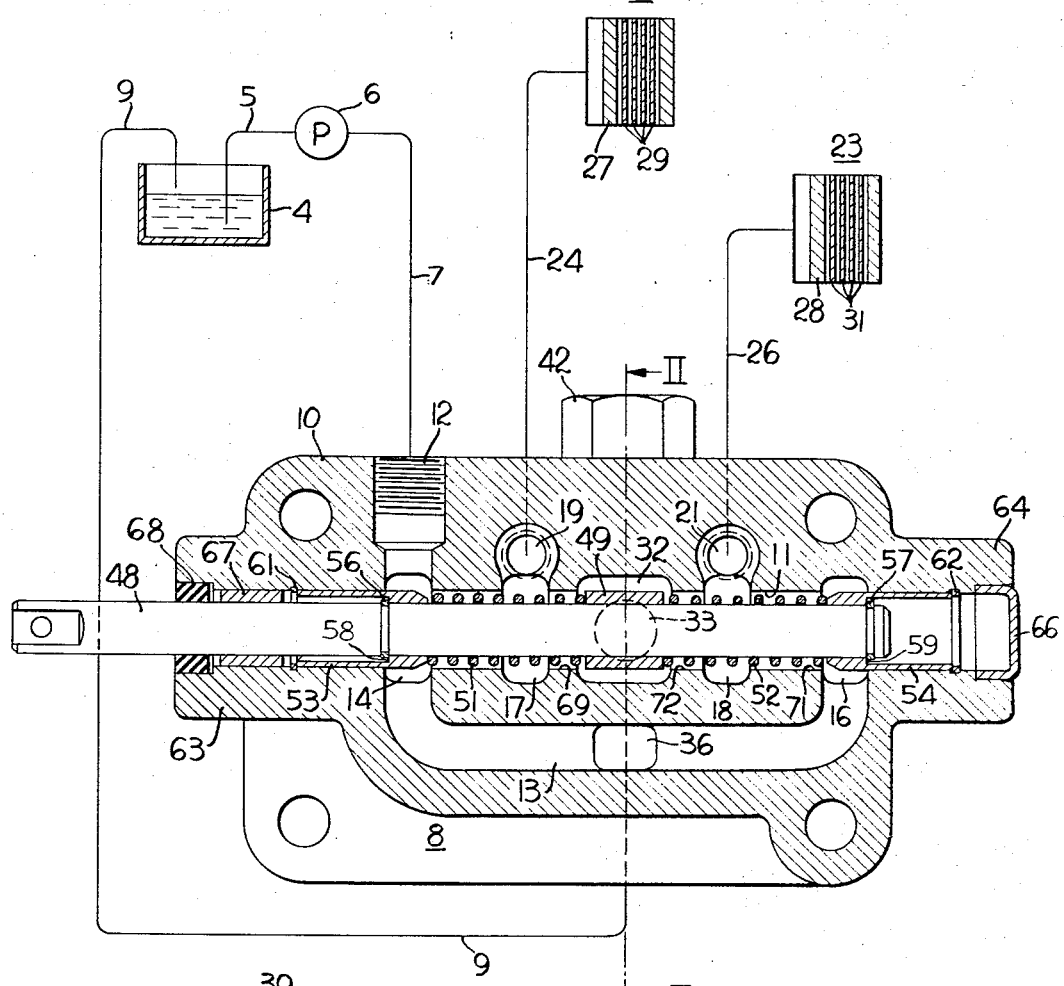
Figure 2:
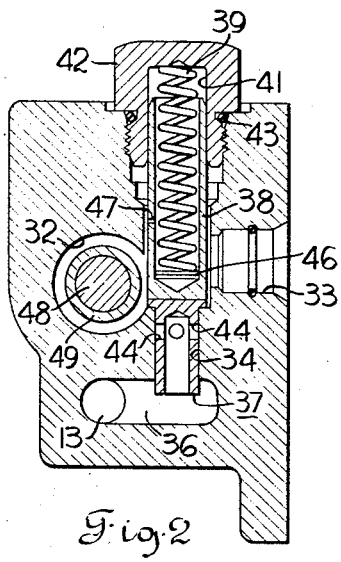

The foregoing objects, features and advantages of the present invention will become more apparent to those familiar with the art from the following detailed description of a preferred embodiment thereof as shown in the accompanying drawing forming a part hereof and wherein:

FIG. 1 is a schematic of a fluid system in which the improved valve of the present invention is shown in section; and, FIG. 2 is a section view on line II—II of FIG. 1.

Referring now to FIG. 1, a fluid system is shown wherein a sump 4 provides fluid to the intake pipe 5 of a pump 6 which in turn pressurizes such fluid and delivers it through an output pipe 7 to a control valve 8 having an outlet line 9 returning to sump 4.

Control valve 8 includes a housing 10 having a valve bore 11 extending through the housing from one end to the other. Valve housing 10 has a supply passage including an inlet 12 connected to outlet pipe 7 and the supply passage includes a branched passage 13 having branch inlet portions 14 and 16 which intersect valve bore 11. Between the branches 14 and 16 there are a pair of outlet passages 17 and 18 intersecting valve bore 11 which are open to the exterior of valve housing 10 by means of outlet ports 19 and 21, respectively, which are hydraulically connected to clutches 22 and 23, respectively, by means of lines 24 and 26, respectively.

Clutches 22 and 23 are fluid actuated clutches of conventional design and include operating pistons 27 and 28, and plates 29 and 31, respectively.

Centrally located in the valve body is another passage 32 intersecting valve bore 11 and which passage is open to the exterior of valve housing 10 by means of an exhaust port 33 which has a return connection to sump 4 by means of outlet line 9. Intersecting the passage 32 is another passage 34 (see FIG. 2) which is in communication with branched passage 13 by means of passage 36. The passage 36 is closed by means of a relief valve 37 (see FIG. 2) which is slidably received in passage 34. Relief valve 37 is biased toward its closed position by means of a spring guide 38 which is recessed to receive a coiled compression spring 39. The outer end of spring 39 and guide 38 are supported and guided in a recessed opening 41 in a threaded cap 42. Cap 42 is provided with a seal 43 to prevent leakage of fluid. Relief valve 37 is provided with four radial openings 44 through which pressure fluid is returned to sump 4 when the pressure in branch 13 exceeds the relief valve spring setting and thereby causes movement of valve 37 in passage 34. Shims 46 are provided between spring 39 and guide 38 to adjustably vary the pressure required to actuate the relief valve. A relatively small opening 47 is provided in the spring guide 38 to permit ingress or egress of fluid from the variable chamber defined by spring guide 38 and cap 42. This opening 47 permits the associated assembly to function as a dampener or dashpot arrangement to prevent chattering of the relief valve.

Referring to FIG. 1, a control rod 48 is received by valve bore 11 and slidably mounts a centrally located piston or spool 49. A pair of identical coiled compression springs 51 and 52 surround the control rod and are spaced apart by spool 49 with the inner or opposed ends of the springs 51 and 52 bearing against the ends of sliding spool 49. A pair of plungers 53 and 54 are slidably mounted on control rod 48 and arranged so that their inner ends contact the outer ends of springs 51 and 52, respectively. Movement of control rod 48 is selectively transferred to plungers 53 and 54 by means of snap rings 56 and 57, respectively, mounted on control rod 48 and which rings contact abutments 58 and 59, respectively, formed internally of plungers 53 and 54. Snap rings 61 and 62 are provided in the outer end portions 63 and 64, respectively, of valve bore 11 to limit outward movement of plungers 53 and 54 relative to valve housing 10. One end of valve bore 11 is closed by means of a plug 66 and the rod end of valve bore 11 is provided with a bushing 67 and oil seal 68 to provide sliding support and prevent fluid leakage.

In the neutral position of the control rod 48, as shown in FIG. 1, fluid from pump 6 enters inlet port 12 and flows into branch supply passages 13, 14 and 16. From passages 14 and 16, the fluid passes through valve bore 11 and into central exhaust passage 32. From exhaust passage 32 the fluid is returned to sump 4 through outlet port 33 and line 9. As long as the control rod is in its neutral position, fluid from the pump passes through the valve in the manner just described and since the fluid circulates freely from the valve inlet to the valve exhaust outlet, it is at relatively low pressure.

The control rod can be deposited in three different positions: a neutral position as has already been described, a left position, and a right position. When control rod 48 is moved to the left, snap ring 57 will contact abutment 59 in plunger 54 to also transmit the same movement to the left to plunger 54 and thus progressively restrict the flow of fluid until passage 16 is shut off from exhaust passage 32. At the same time plunger 54 will compress spring 52 which in turn urges spool 49 to the left to progressively close off the outlet passage to sump 4 defined by land 69 and spool 49. During this closure process, pressure will build up in supply passages 13, 14 and passage 17 to pressurize piston 27 and the plates 29 of clutch 22. Further movement of control rod 48 by the operator will continue a compress spring 52 resulting in further movement of spool 49 against the buildup of fluid pressure in passage 17. Thus the pressure on clutch 22 is progressively raised until spring 52 compresses solid to completely shut off the flow of fluid to sump 4 from the passage defined by land 69 and spool 49. After the flow of fluid to sump 4 is completely cut off, the pressure on clutch 22 continues to rise until the desired pressure is reached at which time relief valve 37 unseats to provide a path to sump and maintain the clutch pressure at the desired preset amount.

It should be noted that from the foregoing it is seen that when control rod 48 is moved to the left, two paths of pressure fluid return to sump are being acted upon. One path defined by land 71 and plunger 54 is positively being closed by the leftward movement of rod 48. The other path defined by land 69 and spool 49 is impositively being closed in view of the fact that spool 49 can move to the right against the bias of spring 52 if the fluid pressure on the left end of spool 49 is sufficient to cause such movement. It is this impositive closing which compensates for any sudden rise in pressure which could cause shock. It is therefore apparent that means have been provided wherein an operator can actuate a clutch hydraulically in a shockfree manner and wherein the operator is provided with a feel for the pressure being built up. It is this pressure being built up on the left end of spool 49 providing a feedback which provides the operator with this sense of feel. Accordingly, the operator adjusts the rate of movement of control rod 48 in accordance with the feel to obtain shockfree operation.

When the control rod 48 is moved to the right snap ring 56 will contact abutment 58 in plunger 53 to also transmit the same movement to the right to plunger 53 and thus progressively restrict the flow of fluid until passage 14 is shut off from exhaust passage 32. At the same time plunger 53 will compress spring 51 which in turn urges spool 49 to the right to progressively close off the outlet passage to sump 4 defined by land 72 and spool 49. During this closure process pressure will build up in supply passages 13, 14, 16 and 18 to pressurize piston 28 and the plates 31 of clutch 23. Further movement of control rod 48 by the operator will continue to compress spring 51 resulting in further movement of spool 49 against the buildup of fluid pressure in passage 18. Thus the pressure on clutch 23 is progrressively raised until spring 51 compresses solid to completely shut off the flow of fluid to sump 4 from the passage defined by land 72 and spool 49. After the flow of fluid is completely cut off, the pressure on clutch 23 continues to rise until the desired pressure is reached at which time relief valve 37 will unseat if the pressure continues rising to provide a path to sump until the pressure has been reduced to the desired amount.

From the foregoing description, it should be apparent that either of the two clutches can be selectively and gradually pressurized up to its operating pressure. The movement of spool 49 by means of spring pressure initially against fluid pressure results in smooth shock-free engagement of the clutch plates. This automatic progressive feathering of the valve prevents a rapid pressure rise to assure a smooth clutch engagement.

The embodiments of the invention in which an exclusive property or privilege is claimed are defined as follows:

1. In combination a control valve assembly comprising an elongated body having a longitudinally extending bore therein, inlet and outlet ports in said body which communicate with said bore, an actuating rod slidably disposed in said bore, said rod including a spool slidably mounted therein and actuable between three positions, a neutral position, a first clutch actuating position, and a second clutch actuating position, a pair of springs mounted about said rod and spaced apart by said inner spool, piston members slidably mounted on said rod in abutting relation to the outer end of said springs, means adjacent the ends of said rod for retaining said pistons in abutting relation to said springs, one of said outlet ports being located about said inner spool when said spool is positioned in said neutral position, said pistons and said spool being of the same diameter as said bore, said inlet having a branch passage extending to a port about one of said pistons, the other of said pistons being located in said inlet, a second outlet port connected to said bore in spaced relation to said first outlet, a third outlet port connected to said bore in spaced relation to said first outlet and on the other side thereof, a pair of fluid actuated clutches, said second and third outlets being hydraulically connected with said fluid actuated clutches, hydraulic pressure means connected to said inlet, sump means connected to said first outlet, said valve being so constructed that when said actuating rod is positioned in a neutral position pressure fluid moves through said inlet, bore, and outlet to sump and when said operating rod is moved in one direction pressure fluid moves through said inlet and bore against the bias of one said springs to gradually actuate one of said clutches and when said rod is moved in the opposite direction pressure fluid moves through said inlet and branch passage to the other of said clutches for gradually actuating same against the bias of the other of said springs.

2. The combination as recited in claim 1 and including a relief valve position between said inlet branch and said outlet for limiting the pressure in said second and third outlets.

3. The combination as recited in claim 1 and wherein said spool is moved impositively during the early portion of movement to positions one and two and wherein said spool is moved positively during the later portion of said movement.

4. The combination as recited in claim 1 and wherein said springs are interchangeable.

5. The combination as recited in claim 4 and wherein said pistons are interchangeable.

References Cited

UNITED STATES PATENTS

| | | | |
|---|---|---|---|
| 794,899 | 7/1905 | Sturtevant | 192—109 |
| 2,301,099 | 11/1942 | Upp | 192—87.19 |
| 3,199,647 | 8/1965 | Staab | 192—87.19 |
| 3,215,236 | 11/1965 | Pensa | 192—109 |

FOREIGN PATENTS

| | | |
|---|---|---|
| 524,702 | 8/1940 | Great Britain. |

BENJAMIN W. WYCHE III, *Primary Examiner.*